United States Patent

[11] 3,552,485

| [72] | Inventors | Jean-Pierre Le Jannou;<br>Noel Lions, Manosque, France |
|---|---|---|
| [21] | Appl. No. | 765,546 |
| [22] | Filed | Oct. 7, 1968 |
| [45] | Patented | Jan. 5, 1971 |
| [73] | Assignee | Commissariat A L'Energie Atomique<br>Paris, France |
| [32] | Priority | Oct. 20, 1967 |
| [33] | | France |
| [31] | | No. 125315 |

[54] COLD TRAP
5 Claims, 1 Drawing Fig.

[52] U.S. Cl. .................................................. 165/119,
210/186; 62/55.5
[51] Int. Cl. ....................................................... F28b 19/00
[50] Field of Search .......................................... Consulted/176; 165/119; 210/186, 69

[56] References Cited
UNITED STATES PATENTS
| 2,745,552 | 5/1956 | Bruggeman et al. ........... | 165/119X |
| 2,863,558 | 12/1958 | Brondyke et al. ............. | 210/186X |

Primary Examiner—Robert A. O'Leary
Assistant Examiner—Theophil W. Streule
Attorney—Cameron, Kerkam and Sutton ABSTRACT: A cold trap for a liquid metal circulation system comprises a circulation vessel containing successively an economizer coil unit, a heat exchanger for effecting the cooling of the liquid metal and a filter unit for impurities. The filter unit is made up of two sections mounted in end-to-end relation. The first section is of small thickness and is placed at the level of said heat exchanger whilst the second filter section is of greater thickness and is placed at the outlet of the heat exchanger. Said second filter section has the shape of a cylinder whose lateral surface is in contact with the flow of cooled liquid metal and is connected internally to the economizer coil unit so as to permit the discharge of liquid metal from the trap.

PATENTED JAN 5 1971
3,552,485
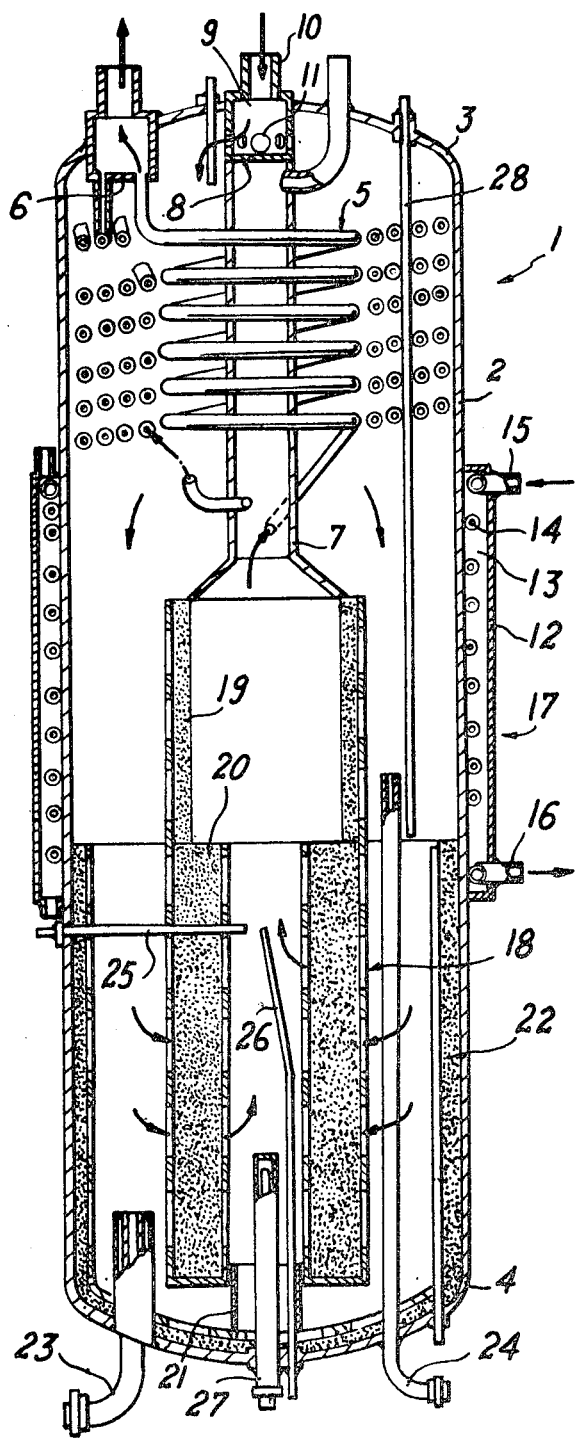

COLD TRAP

This invention relates to a cold trap, the intended function of which is to retain impurities which are dissolved in a liquid and more especially in a liquid metal which is circulated within a fluid circuit of the type employed in nuclear reactors of the fast neutron type for the purpose of cooling the reactor core.

Cold traps of known types which are designed to meet this requirement are accordingly constituted by a closed vessel containing a circulation coil, the liquid metal to be freed of its impurities being intended to penetrate into the vessel externally of the coil. After suitable cooling to the saturation temperature at which the impurity crystals begin to appear, the liquid metal is caused to flow through a filter constituting the trap proper which is placed in the cooling zone and is then discharged by being passed through the coil which thus plays the part of a built-in heat-exchanger economizer. However, in traps of this type in which the filter is designed in the form of a cylinder and the liquid sodium is admitted at the base of the cylinder, it has been found that blockage of the trap occurs over a very short period of time since impurities are deposited rapidly over the entire sodium inlet surface of the filter at the level of the heat exchanger which serves to cool the sodium.

The present invention relates to a cold trap which is mainly intended to circumvent the disadvantage of rapid clogging of the trap by putting the free available volume within said trap to a more rational use.

To this end, the trap under consideration which comprises a vessel containing successively an economizer-coil unit, a heat exchanger for effecting the cooling of the liquid metal and a filter unit for impurities, is characterized in that said filter unit is made up of two sections mounted in end-to-end relation, the first filter section having a small thickness of filter element and being placed at the level of said heat exchanger whilst the second filter section which has a greater thickness of filter element is placed at the outlet of said heat exchanger, said second filter section having the shape of a cylinder whose lateral surface is in contact with the flow of cooled liquid metal and is connected internally to said economizer-coil unit so as to permit the discharge of said liquid metal from the trap.

Said filter unit advantageously comprises filter elements constituted by cylinders of stainless-steel wool.

The complementary description which now follows and which is given without any limitation being implied illustrates one example of construction of a cold trap in accordance with the invention, reference being made to the accompanying drawings in which the single FIG. is a diagrammatic vertical sectional view of said cold trap.

As is apparent from this FIG., the trap under consideration essentially comprises a closed vessel 1 constituted by a lateral cylindrical shell 2 having a vertical axis and closed by two upper and lower domical ends 3 and 4. The trap comprises, associated with the vessel 1 and disposed successively from the upper end to the lower end, a coil unit 5 formed of a plurality of separate winding tubes mounted in parallel, the ends of said winding tubes being intended to open respectively into a collector box 6 on the one hand and into a cylindrical chimney 7 on the other hand, said chimney being placed in the axis of the coil unit. A closure plate 8 is fitted at the upper end of said chimney and delimits with the cover 3 of the vessel 1 a chamber 9 into which opens a pipe 10. The liquid metal which, in the example under consideration, is sodium and which is to be freed of its impurities is admitted through said pipe 10. Openings 11 which provide passageways are formed in the top portion of the chimney 7 so as to put the chamber 9 into communication with that region of the vessel 1 which is located outside said chimney.

The vessel 1 is provided with an annular jacket 12 which is located immediately beneath the coil unit 5 and outside the shell 2. Said jacket defines an enclosed spaced 13 which is preferably filled with a suitable stagnant liquid such as the sodium-potassium eutectic mixture. A piping system 14 is mounted inside the space 13 and surrounds the outer face of the shell 2, there being established within said piping system a continuous circulation of a suitable cooling fluid which is admitted therein by means of a duct 15 and discharged therefrom by means of a second duct 16. Said piping system 14 for the continuous circulation of coolant and the jacket 12 constitute a heat-transfer system which is designated hereinafter by the reference 17 and serves to cool the sodium which is admitted into the apparatus in the manner which will be described hereinafter.

In accordance with the invention, the trap then comprises a filter 18 which is essentially constituted by two hollow cylindrical sections 19 and 20 mounted in end-to-end relation and constructed by means of suitable thicknesses of an adequate filter element such as, in particular, stainless-steel wool. The section 19 of the filter 18 is substantially smaller in thickness than the section 20 and is placed within the heat exchanger unit 17 whilst the filter section 20 is placed at the outlet of this latter. The filter 18 is associated at the lower end thereof with a screen 21 which forms a baffle and serves primarily to prevent the liquid sodium which circulates within the space formed between the filter 18 and the shell 2 from flowing upwards within the central region of the filter without first having passed through the corresponding thicknesses of steel wool.

Finally, the apparatus is completed by means of ancillary elements of standard design consisting in particular of heat insulation of the lower portion of the shell 2 and of the domical end 4 by means of a suitable thickness 22 of steel wool, of sealed ducts 23 and 24 which serve to drain out the vessel if the need should arise, and of thermocouples 25 or 26 which make it possible to take measurements of temperature at different points within the trap, a pyrometric tube 28 being additionally provided for the purpose of regulating the value of said temperature in combination with the rate of flow of coolant through the heat exchanger unit 17. Finally, a glove finger 27 makes it possible to introduce into the trap any other suitable experimentation or testing equipment.

The operation of the trap as described in the foregoing is accordingly as follows: the liquid sodium which it is desired to free of its impurities is introduced into the vessel 1 through the pipe 10. The sodium passes out of the chamber 9 through the openings 11 and flows downwards within the trap externally of the coil unit 5 until it reaches the region of the heat exchanger unit 17. At this point, the liquid sodium is suitably cooled to its saturation temperature, whereupon sodium crystals begin to appear and carry down the different impurities. These crystals are fixed on the filter 18 by means of the thicknesses of steel wool of the cylinders 19 and 20 whilst the sodium which remains in the liquid state after passing through the filter flows up within the central portion of this latter to the chimney 7 so as to be discharged through the coil unit 5 up to the outlet box 6.

By virtue of these arrangements which consist primarily in separating the filter into two superposed sections, any premature blockage of the trap and especially of the upper portion of this latter which is located within the heat-exchanger unit 17 is accordingly prevented. Moreover, it is noted that the liquid sodium penetrates into the filter through the entire lateral surface of the steel wool cylinders 19 and 20 whereas, in the forms of construction which are already known, the sodium penetrated only through the base of the cylindrical filter which was employed. Under these conditions, the surface which is provided for flow through the filter is increased to a considerable extent and the impurities which are initially deposited in the upper section of the filter do not prevent the remaining impurities from being trapped progressively as the filter is clogged. In fact, the arrangement which has been chosen permits of a considerable increase in the length of the current lines of the sodium within the lower portion of the cold trap without thereby causing any stoppage of the flow. Finally, a notable practical advantage of the top coil unit which plays the part of a built-in economizer lies in the fact that the cold sodium which passes out of the apparatus through the interior of said coil unit serves to cool the sodium which passes into the apparatus before this latter reaches the main heat exchanger.

As will be readily understood, the invention is not limited in any sense to the example of construction which has been described and illustrated but is intended on the contrary to extend to all alternative forms.

We claim:

1. A cold trap for a liquid-metal circulation system, comprising a circulation vessel which contains successively an economizer-coil unit, a heat exchanger for effecting the cooling of the liquid metal and a filter unit for impurities, characterized in that said filter unit is made up of two sections mounted in end-to-end relation, the first filter section having a small thickness of filter element and being placed at the level of said heat exchanger whilst the second filter section which has a greater thickness of filter element is placed at the outlet of said heat exchanger, said second filter section having the shape of a cylinder whose lateral surface is in contact with the flow of cooled liquid metal and is connected internally to said economizer coil unit so as to permit the discharge of said liquid metal from the trap.

2. A cold trap in accordance with claim 1, characterized in that said filter unit comprises filter elements which are constituted by cylinders of stainless-steel wool.

3. A cold trap in accordance with claim 1, characterized in that said heat exchanger is disposed externally of said vessel and comprises an annular jacket which contains a stagnant liquid medium and a piping system for circulating a cooling liquid therein which surrounds the sidewall of said vessel.

4. A cold trap in accordance with claim 1, characterized in that said filter unit comprises a screen forming a baffle which prevents the direct passage of said liquid metal from the exterior to the interior of said filter unit through the ends thereof.

5. A cold trap in accordance with claim 1, characterized in that said liquid metal is sodium.